United States Patent
Wood et al.

(10) Patent No.: US 8,256,719 B2
(45) Date of Patent: Sep. 4, 2012

(54) SHAPE CHANGING AIRFOIL SYSTEM

(75) Inventors: Jeffrey H. Wood, Eureka, MO (US); James P. Dunne, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 712 days.

(21) Appl. No.: 12/325,687

(22) Filed: Dec. 1, 2008

(65) Prior Publication Data

US 2010/0133387 A1    Jun. 3, 2010

(51) Int. Cl.
*B64C 21/00* (2006.01)
(52) U.S. Cl. .................. 244/200; 244/214; 244/219
(58) Field of Classification Search .................. 244/113, 244/130, 134 A, 200, 213, 214, 215, 219
See application file for complete search history.

(56) References Cited

U.S. PATENT DOCUMENTS

| | | | |
|---|---|---|---|
| 1,747,637 A * | 2/1930 | Larsen ........................... 244/219 |
| 1,785,300 A * | 12/1930 | Castelcicala .................... 244/21 |
| 2,297,951 A * | 10/1942 | Frank ......................... 244/134 A |
| 2,659,896 A * | 11/1953 | Biasi ............................... 623/64 |
| 2,755,039 A * | 7/1956 | Davie, Jr. ....................... 244/187 |
| 2,763,448 A * | 9/1956 | Davie, Jr. ....................... 244/214 |
| 3,994,452 A | 11/1976 | Cole |
| 4,053,124 A | 10/1977 | Cole |
| 4,200,253 A | 4/1980 | Rowarth |
| 4,351,502 A | 9/1982 | Statkus |
| 4,429,844 A | 2/1984 | Brown et al. |
| 4,475,702 A | 10/1984 | Cole |
| 4,553,722 A | 11/1985 | Cole |
| 4,650,140 A | 3/1987 | Cole |
| 4,706,913 A | 11/1987 | Cole |
| 5,590,854 A * | 1/1997 | Shatz ............................. 244/206 |
| 6,588,709 B1 | 7/2003 | Dunne et al. |
| 6,622,973 B2 * | 9/2003 | Al-Garni et al. .............. 244/206 |
| 6,796,534 B2 | 9/2004 | Beyer et al. |
| 7,264,206 B2 | 9/2007 | Wheaton et al. |
| 7,270,305 B2 | 9/2007 | Rampton et al. |
| 7,322,547 B2 | 1/2008 | Konings |
| 7,338,018 B2 | 3/2008 | Huynh et al. |

* cited by examiner

*Primary Examiner* — Tien Dinh
*Assistant Examiner* — Michael Kreiner
(74) *Attorney, Agent, or Firm* — Yee & Associates, P.C.

(57) ABSTRACT

A method and apparatus for an airfoil, a flexible skin, and a shape control system. The flexible skin forms a control surface of the airfoil. The shape control system is capable of changing a shape of the control surface formed by the flexible skin between a plurality of shapes, wherein a gap does not occur during a changing of the shape of the control surface.

15 Claims, 8 Drawing Sheets

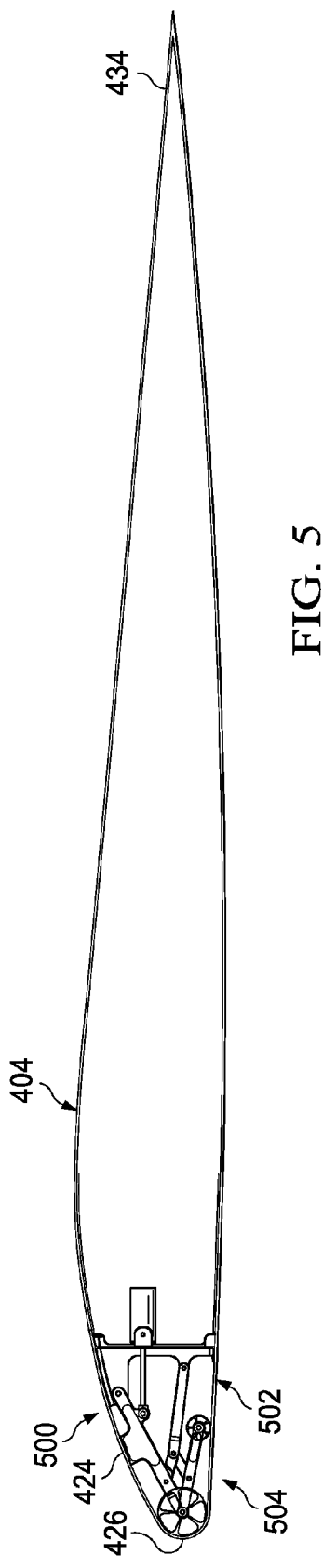
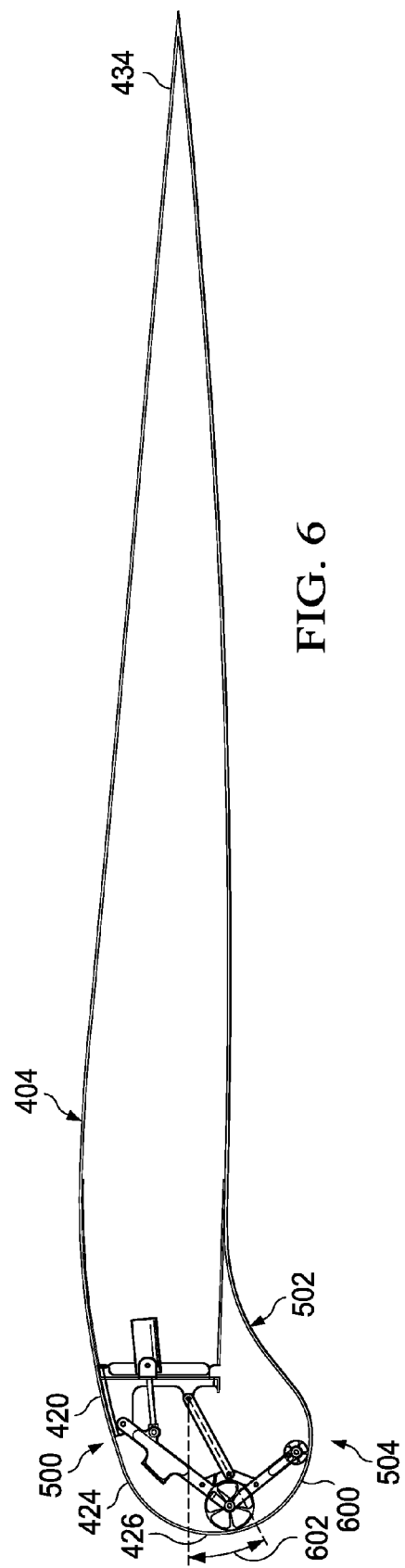

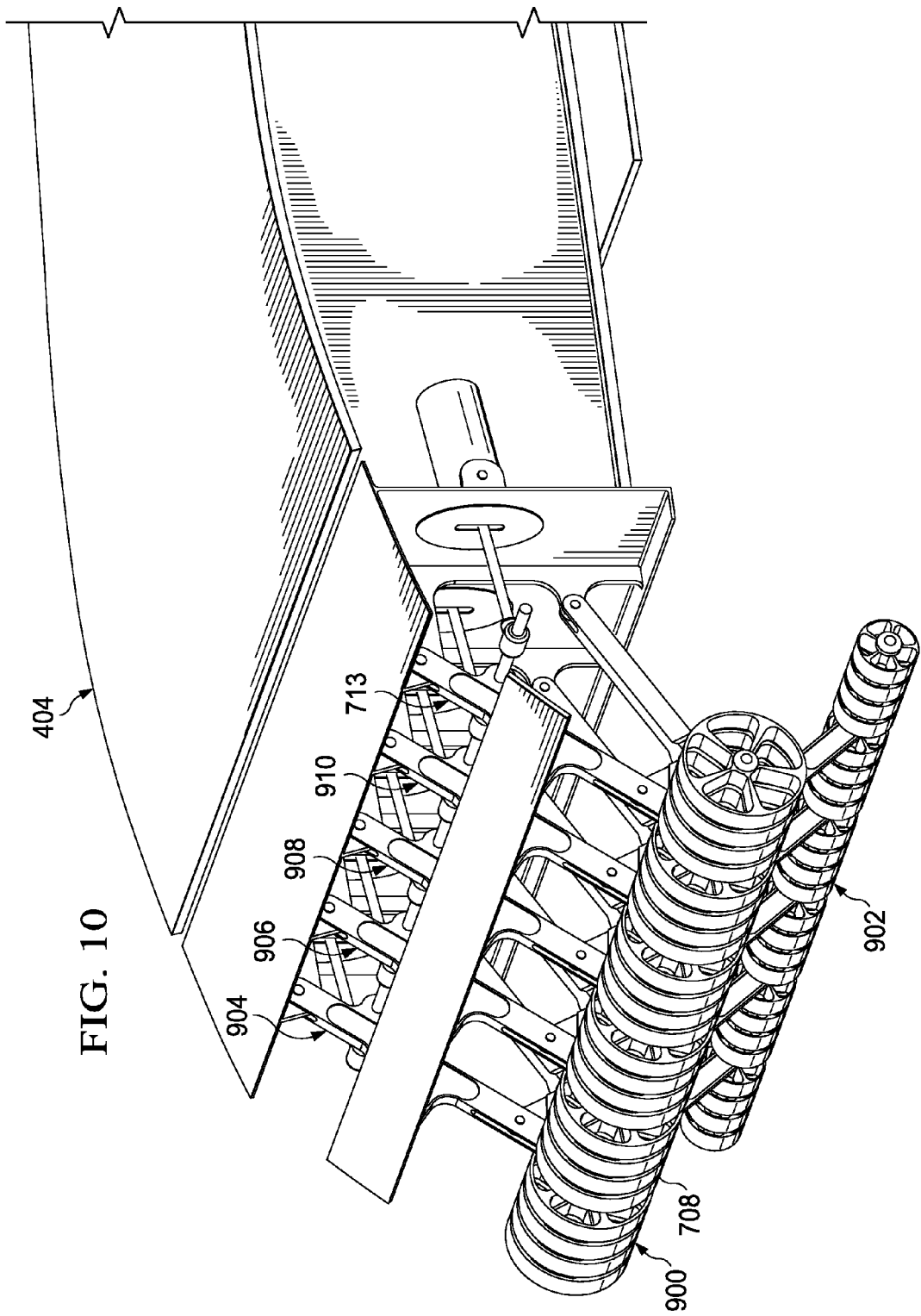

SHAPE CHANGING AIRFOIL SYSTEM

BACKGROUND INFORMATION

1. Field

The present disclosure relates generally to aircraft and, in particular, to a method and apparatus for controlling aerodynamic performance of an aircraft. Still more particularly, the present disclosure relates to a method and apparatus for changing the shape of an airfoil for an aircraft.

2. Background

An aircraft is a type of vehicle capable of flying through the atmosphere. Aircraft may include fixed wing aircraft and rotor craft. The flight of an aircraft may be controlled by a number of airfoils. An airfoil is a part that may provide aerodynamic performance for an aircraft. An airfoil may be, for example, a wing or blade. The design and shape of airfoils may generate lift, control stability, change direction, change drag, and/or change other suitable aerodynamic parameters for an aircraft.

Flight control surfaces on an airfoil of an aircraft may be used to change the direction of an aircraft around three axes. These axes include a vertical axis, a longitudinal axis, and a lateral axis. A vertical axis passes through an aircraft from top to bottom. Rotation or movement about this axis is called yaw. Yaw changes the direction of the nose of an aircraft pointing it to the left or right. The longitudinal axis passes through the aircraft from the nose to the tail. Rotation about this axis is referred to as bank or roll. The lateral axis passes from one wing tip of an aircraft to another wing tip of an aircraft. Rotation about this axis is referred to as pitch.

Different control surfaces such as, for example, an aileron, an elevator, a rotor, a trim, a rudder, a spoiler, a flap, a slat, or other suitable control surfaces may be moved to change the shape of an airfoil to provide for different axes of motion for the aircraft. These control surfaces may be used to optimize the aerodynamic surfaces of an airfoil.

For example, a slat may be located at a leading edge of an airfoil in the form of a wing. A slat is an extension to the front of a wing to provide lift augmentation. Further, a slat may reduce a stalling speed by altering airflow over the wing. Movement of this type of control surface, as well as other control surfaces, during flight may be performed to maximize the handling and performance of the aircraft. For example, a wing may be configured to have a sleek leading edge for high-speed flight. The wing may be reconfigured to have a blunt leading edge for low-speed flight.

When modifying the shape of an airfoil, it is desirable to maintain aerodynamic flow, while minimizing drag and turbulence over the airfoil. One manner in which this characteristic may be achieved is to maintain a contiguous surface on the skin of the airfoil without disruptions around the airfoil in the form of gaps. Current airfoil changing systems for leading edge wings include extension or unfolding mechanisms that protrude into the airstream to modify aerodynamic characteristics. These types of systems, however, create voids in the continuity of the skin on the airfoil that can generate turbulence.

Further, other airfoil shape changing systems may allow the leading edge to lower to provide a blunt leading edge to modify the camber, which is the asymmetry between the top and bottom curves of an airfoil and cross section. These types of systems, however, do not allow for a shape change in the leading edge that is simultaneous with a grouping action. As can be seen, with current airfoil change systems, the types of changes to the surface of an airfoil may be limited and/or may generate gaps that reduce aerodynamic performance.

Therefore, it would be advantageous to have a method and apparatus that addresses at least some of the issues discussed above.

SUMMARY

In one advantageous embodiment, an apparatus comprises an airfoil, a flexible skin, and a shape control system. The flexible skin forms a control surface of the airfoil. The shape control system is capable of changing a shape of the control surface formed by the flexible skin between a plurality of shapes, wherein a gap does not occur during a changing of the shape of the control surface.

In another advantageous embodiment, an aircraft comprises an airfoil, a flexible skin, a rigid skin, a roller system, a plurality of linkages, and an actuator system. The flexible skin forms a portion of a surface of the airfoil. The rigid skin forms another portion of the surface of the airfoil. The rigid skin and the flexible skin are adjacent to each other and form a contiguous skin surface for the airfoil. The roller system is capable of engaging an interior surface of the flexible skin. The plurality of linkages is coupled to the roller system. The actuator system is capable of moving the plurality of linkages in a manner that causes the roller system to move against an interior of the flexible skin to change a shape of the flexible skin between a plurality of shapes.

In yet another advantageous embodiment, a method is present for changing a configuration of an airfoil. A signal is received at an actuator system to change a shape of the airfoil having a flexible skin from an undeployed shape to a deployed shape. The actuator system is activated to move a plurality of linkages connected to a roller system to engage an interior surface of the flexible skin adjacent to a rigid skin in response to receiving the signal. The flexible skin changes from an undeployed shape to a deployed shape.

The features, functions, and advantages can be achieved independently in various embodiments of the present disclosure or may be combined in yet other advantageous embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 5 is a diagram illustrating a cross-sectional view of an airfoil in accordance with an advantageous embodiment;

FIG. 6 is a diagram illustrating a cross-sectional view of an airfoil in accordance with an advantageous embodiment;

FIG. 10 is a diagram illustrating a portion of an airfoil in accordance with an advantageous embodiment.

DETAILED DESCRIPTION

Figure 1:
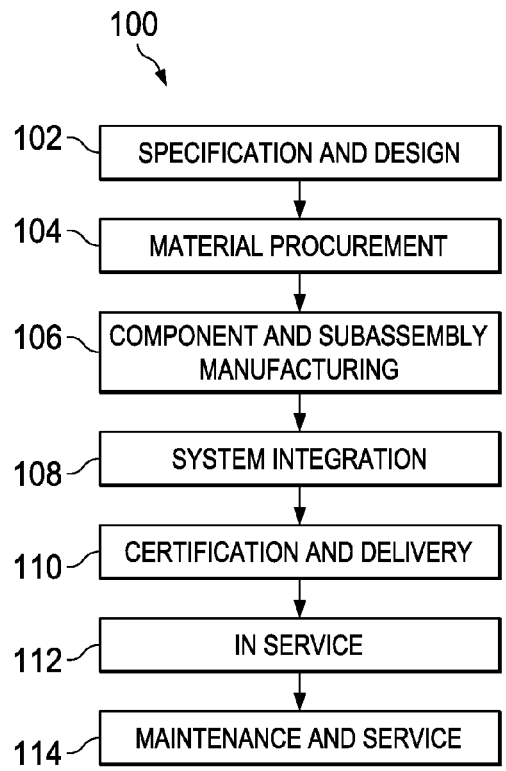
FIG. 1 is a diagram illustrating an aircraft manufacturing and service method in accordance with an advantageous embodiment.
Figure 2:
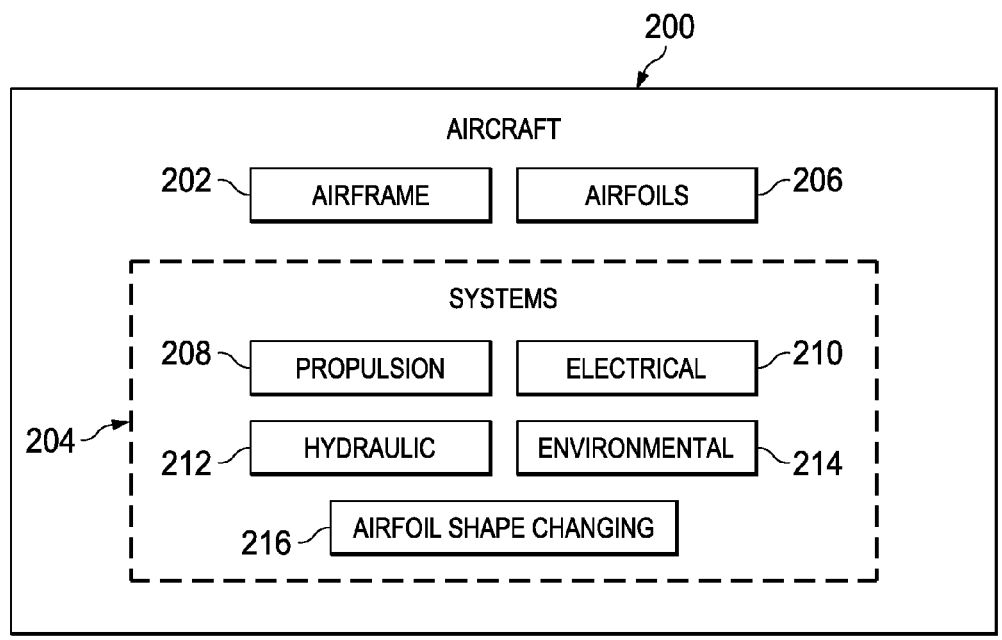
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and airfoils 206. Examples of systems 204 include one or more of propulsion system 208, electrical system 210, hydraulic system 212, environmental system 214, and airfoil shape changing system 216. Any number of other systems may be included.

Although an aerospace example is shown, different advantageous embodiments may be applied to other industries, such as the automotive industry. An airfoil in airfoils 206 is a part and/or surface whose shape and/or orientation control the aerodynamics of aircraft 200. The aerodynamics include, for example, stability, direction, lift, and other suitable parameters. Airfoil shape changing system 216 may be implemented using different advantageous embodiments.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

For example, the different advantageous embodiments may be used during component and subassembly manufacturing 106 to implement airfoil shape changing system 216 in accordance with advantageous embodiments. Further, the different advantageous embodiments may be implemented during maintenance and service 114 to reconfigure aircraft 200 to include airfoil shape changing system 216.

The different advantageous embodiments also recognize and take into account that it would be desirable to avoid using control surfaces that may generate gaps in the surface of the skin of an airfoil. Flaps and other similar structures tend to have these types of gaps in the surface of the skin of the airfoil. The different advantageous embodiments recognize and take into account that currently available airfoil changing systems are not capable of extending and drooping a control surface at a leading edge of a wing in a manner that does not generate gaps on the surface of the skin of an airfoil. The different advantageous embodiments also recognize and take into account that it may be desirable to have an airfoil that may avoid the use of control surfaces that may project out of a desired aerodynamic contour for the airfoil.

The different advantageous embodiments recognize that during different operating conditions of an aircraft, different airfoil performance characteristics may be desired. For example, operating conditions, such as subsonic, transonic, and/or supersonic flight conditions, may require different airfoil performance characteristics. The different advantageous embodiments recognize that changing the camber of an airfoil, a leading edge portion of the airfoil, and/or a trailing edge portion of the airfoil in a manner that does not induce flow separation in localized regions on the surface of the airfoil also is desirable.

The different advantageous embodiments also recognize that currently used systems may employ slip joints or other similar overlapping skin surfaces. The different advantageous embodiments recognize that these types of designs may have poor structural load paths requiring the skin to act as a load-carrying element.

Thus, the different advantageous embodiments provide an airfoil having a flexible skin that forms a control surface for the airfoil. A shape control system located within the airfoil may be capable of changing the shape of the control surface between a plurality of shapes such that a gap in the surface of the airfoil does not occur during the changing of the shape of the control surface formed by the flexible skin. By avoiding gaps, flow separation in localized regions on the surface of the airfoil may be avoided.

The different advantageous embodiments may not require different portions of the skin to slide under other portions as used in many currently available shape changing systems. Instead, the different advantageous embodiments may provide a contiguous surface for the airfoil in which the change in the shape of the airfoil occurs in the area of the airfoil having the flexible skin.

Figure 3:
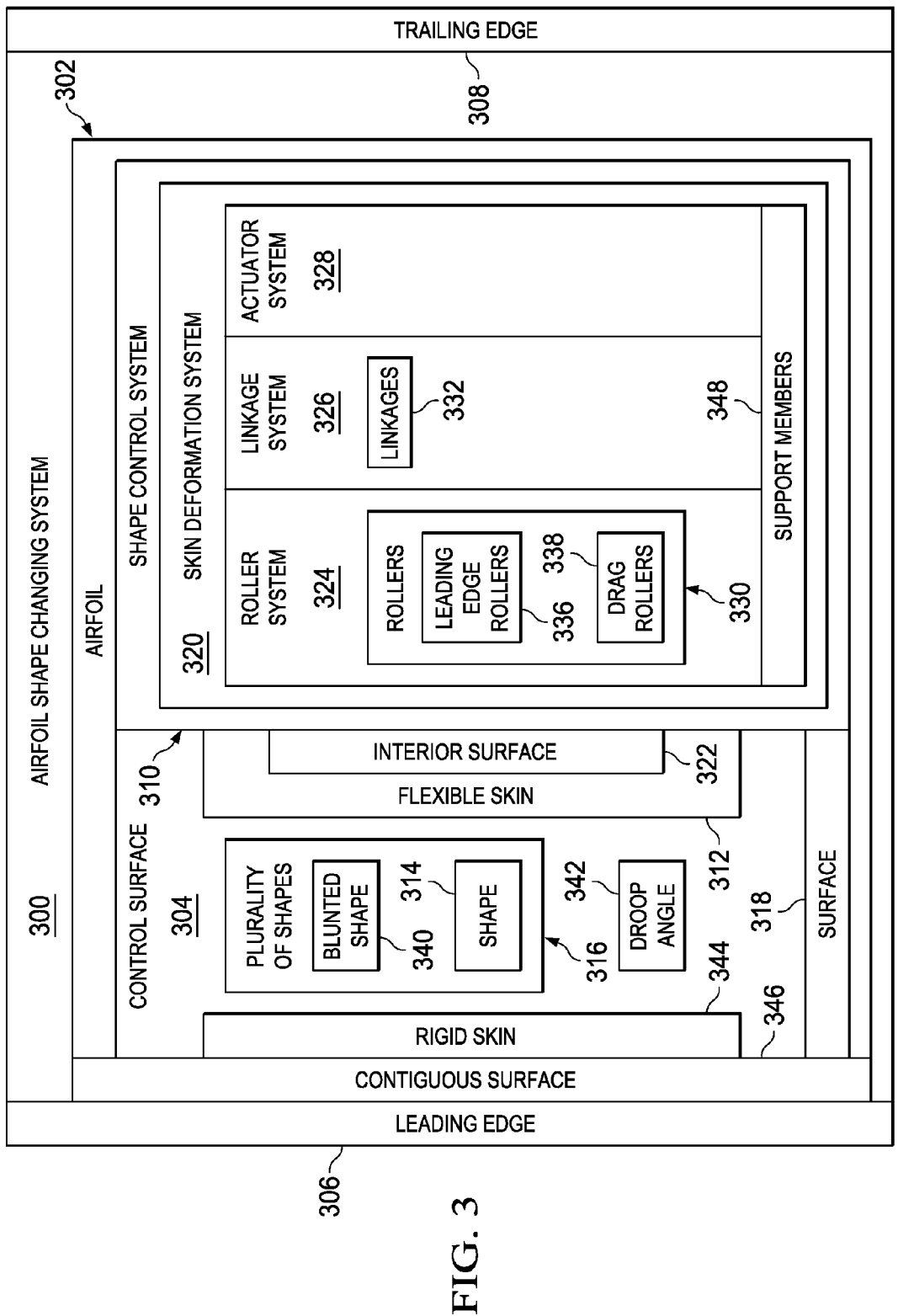
FIG. 3 is a diagram of an airfoil shape changing system in accordance with an advantageous embodiment.

With reference now to FIG. 3, a diagram of an airfoil shape changing system is depicted in accordance with an advantageous embodiment. In this example, airfoil shape changing system 300 is an example of one implementation for airfoil shape changing system 216 for aircraft 200 in FIG. 2.

In this example, airfoil shape changing system 300 may be implemented in airfoil 302. Airfoil shape changing system 300, in this illustrative example, includes control surface 304 and shape control system 310. Control surface 304 is formed by flexible skin 312. Control surface 304 may be located at various locations on airfoil 302. For example, without limitation, control surface 304 may be located at leading edge 306, trailing edge 308, or some other location on airfoil 302.

Shape control system 310 is capable of changing shape 314 of control surface 304 formed by flexible skin 312 between plurality of shapes 316. Flexible skin 312 may be implemented using a number of different materials. In these examples, flexible skin 312 may be an elastic skin without gaps. Any material that may be capable of withstanding forces, loads, and/or stresses from flight and the changing of shape 314 may be used for flexible skin 312. For example, super elastic metallic materials, reinforced elastomers, flexible matrix composites, fluidic flexible matrix composites, and other suitable materials may be used.

The changing of shape 314 between plurality of shapes 316 may be performed in a manner such that a gap in surface 318 of airfoil 302 does not occur during the changing of shape 314 of control surface 304. A gap, in these advantageous embodiments, is any space between two components that may cause an undesired amount of airflow. In other words, the changing of shape 314 between plurality of shapes 316 may be performed in a manner that does not cause flow separation in localized regions on surface 318 of airfoil 302.

In this illustrative example, shape control system 310 includes skin deformation system 320, which applies pressure and/or force to interior surface 322 of flexible skin 312 to change shape 314 of control surface 304. In these illustrative examples, skin deformation system 320 includes roller system 324, linkage system 326, and actuator system 328.

Roller system 324 is capable of engaging interior surface 322 of flexible skin 312 to change shape 314 of control surface 304 between plurality of shapes 316. Linkage system 326 is connected to roller system 324 and capable of moving roller system 324 to change shape 314 of control surface 304 by deforming flexible skin 312. Actuator system 328 may move or change the configuration of linkage system 326 to move roller system 324. In these examples, roller system 324 contains rollers 330 connected to linkages 332 in linkage system 326.

Roller system 324 may have a number of different types of rollers, depending on the particular implementation. For example, when control surface 304 is located at leading edge 306, rollers 330 may include leading edge rollers 336 and drag rollers 338. Leading edge rollers 336 may provide structural strength and reinforcement of leading edge 306 during flight. Drag rollers 338 also may provide support for flexible skin 312.

Leading edge rollers 336 may generate blunted shape 340 for control surface 304, while drag rollers 338 may create droop angle 342 in control surface 304. Blunting leading edge 306 reduces airflow separation at low speeds. The airflow needs to stay attached to prevent stalling and to generate the needed lift. Drooping or increasing droop angle 342 of leading edge 306 increases the airfoil camber, which also generates more lift. Both of these effects are desired at low speeds, such as during takeoff and landing. At higher speeds, both of these shape changes cause significant drag. As a result, it is desirable to reduce the camber and sharpen the lip for better aerodynamic efficiency in the cruise flight regime. Blunted shape 340 and droop angle 342 cannot currently be generated without gaps or sliding surfaces.

The different advantageous embodiments are capable of generating blunted shape 340 with droop angle 342 such that surface 318 of airfoil 302 is contiguous using control surface 304 with flexible skin 312. In these illustrative examples, flexible skin 312 may be adjacent to rigid skin 344 for airfoil 302 to form contiguous surface 346. Rigid skin 344 is a part of control surface 304 that does not move or change shape in these illustrative examples. Skin deformation system 320 also may include support members 348 to support portions of flexible skin 312 in one or more of plurality of shapes 316.

The illustration of airfoil shape changing system 300 in FIG. 3 is not meant to imply physical or architectural limitations to the manner in which different advantageous embodiments may be implemented. For example, other components may be used in addition to, or in place of, the ones illustrated in different advantageous embodiments. Further, in other advantageous embodiments, some components may be unnecessary.

For example, without limitation, skin deformation system 320 might be implemented using sliding members or surfaces rather than rollers 330 in some advantageous embodiments. Additionally, other types of rollers may be used in addition to, or in place of, leading edge rollers 336 and drag rollers 338, depending on the particular implementation. As yet another example, in other advantageous embodiments, it may be desirable to change surface 318 of airfoil 302 at other locations other than leading edge 306 and trailing edge 308.

Figure 4:
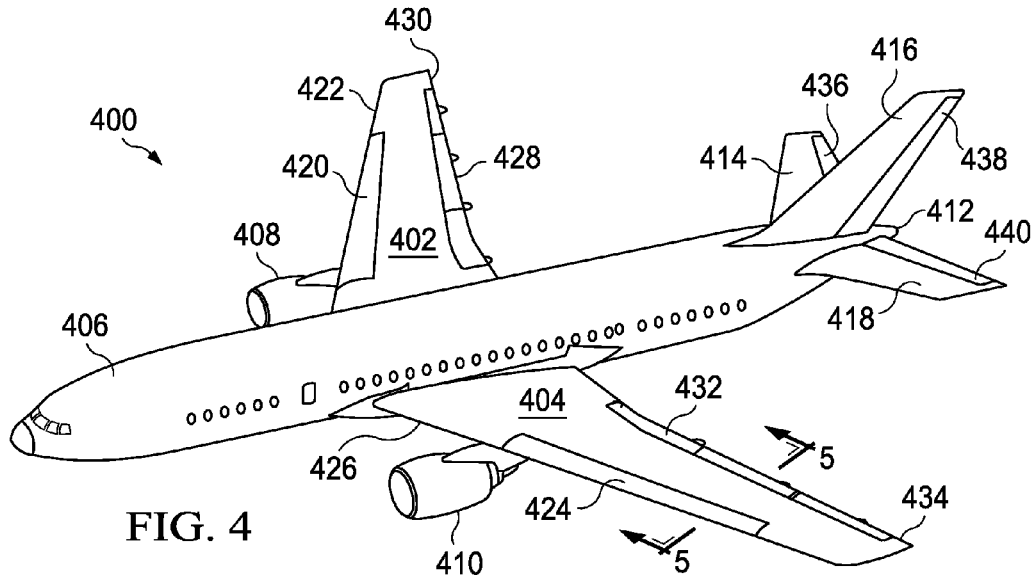
FIG. 4 is a diagram of an aircraft in which an advantageous embodiment may be implemented.

With reference now to FIG. 4, a diagram of an aircraft is depicted in which an advantageous embodiment may be implemented. Aircraft 400 is an example of one implementation for aircraft 200 in FIG. 2 in which an airfoil shape changing system may be implemented.

In this illustrative example, aircraft 400 has airfoils 402 and 404 attached to fuselage 406. Airfoils 402 and 404 take the form of wings in this particular example. Airfoil 402 and airfoil 404 are examples of airfoils in which an airfoil shape changing system may be implemented. Aircraft 400 also includes engine 408, engine 410, and tail 412. Tail 412 contains airfoils 414, 416, and 418 in which airfoil shape changing systems may be implemented.

In the different advantageous embodiments, control surface 420 is located at leading edge 422 of airfoil 402, while control surface 424 is located at leading edge 426 of airfoil 404. In these examples, airfoil 402 also has control surface 428 at trailing edge 430, and airfoil 404 has control surface 432 at trailing edge 434. These control surfaces are additional examples of control surfaces in which an airfoil shape changing system may be implemented. Control surfaces 436, 438, and 440 on airfoils 414, 416, and 418, respectively, are examples of additional control surfaces in which an airfoil shape changing system may be implemented.

The illustration of aircraft 400 in FIG. 4 is not meant to imply physical or architectural limitations to the manner in which advantageous embodiments may be implemented. For example, although aircraft 400 is illustrated as a commercial airliner, other advantageous embodiments may be implemented using other types of aircraft. For example, without limitation, different advantageous embodiments may be implemented in military aircraft, non-fixed wing aircraft, and other suitable types of vehicles.

With reference now to FIG. 5, a diagram illustrating a cross-sectional view of an airfoil is depicted in accordance with an advantageous embodiment. In this example, a cross-sectional view of airfoil 404 taken along lines 5-5 in FIG. 4 is depicted in accordance with an advantageous embodiment.

Airfoil 404 has a sleek shape, rather than a blunted shape, in this view of airfoil 404. In this depicted example, airfoil shape changing system 500 is implemented at leading edge 426 for control surface 424. Airfoil shape changing system 500 includes control surface 424, which is formed by flexible skin 502 and shape control system 504. In this illustrative example, shape control system 504 is depicted in a stowed or undeployed configuration to define a first shape for control surface 424.

In FIG. 6, a diagram illustrating a cross-sectional view of an airfoil is depicted in accordance with an advantageous embodiment. In this illustrative example, shape control system 504 is in a deployed state in which the shape of control surface 424 is in a second shape. As illustrated, airfoil 404 has a blunted shape.

In this second shape, leading edge 426 has blunted shape 600 and droop angle 602. As can be seen, flexible skin 502 remains contiguous without gaps or segments sliding into airfoil 404.

Figure 7:
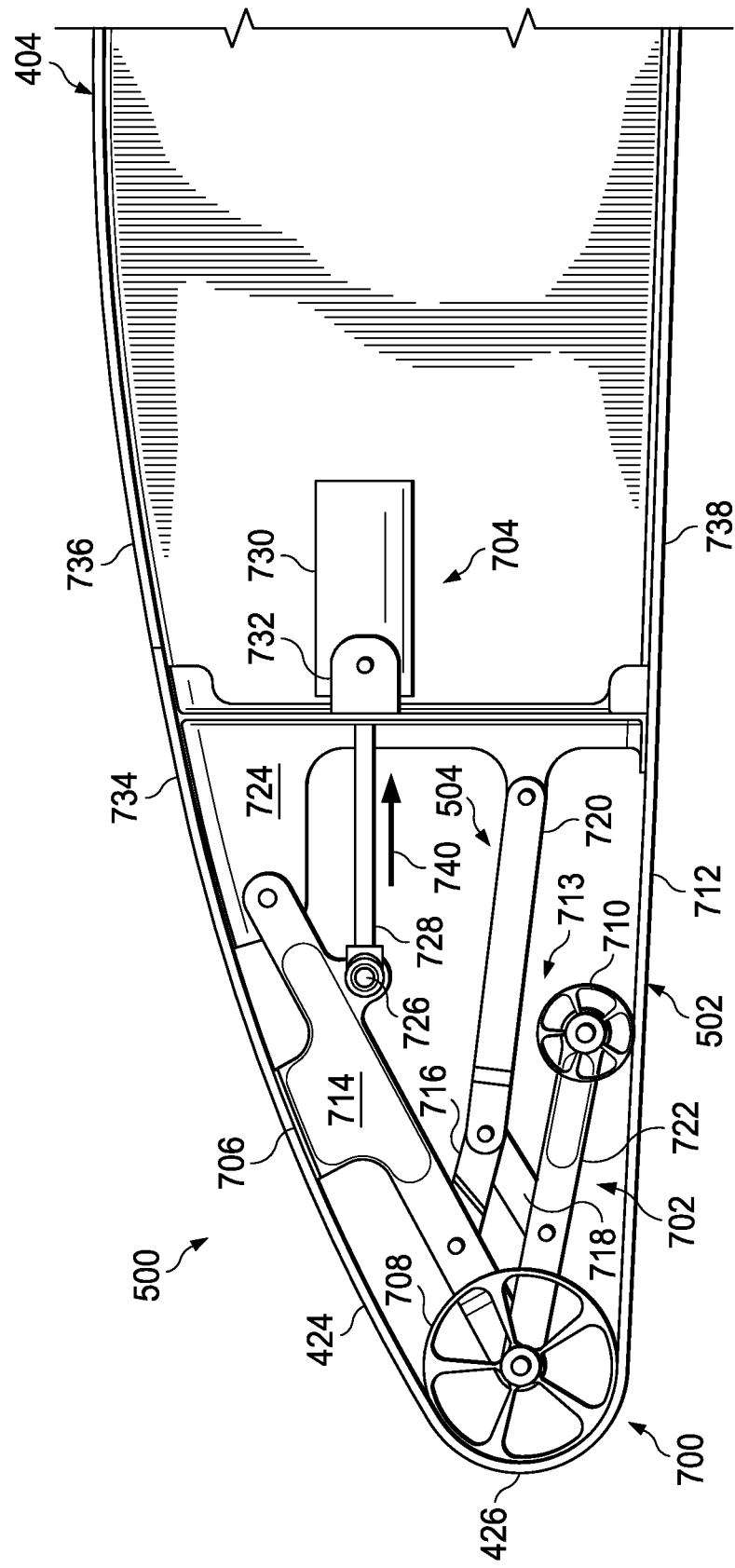
FIG. 7 is a diagram illustrating a cross-sectional view of a portion of an airfoil in accordance with an advantageous embodiment.

Turning now to FIG. 7, a diagram illustrating a cross-sectional view of a portion of airfoil 404 is depicted in accordance with an advantageous embodiment. In this illustrative example, shape control system 504 is in a stowed or undeployed state. Shape control system 504 includes roller system 700, linkage system 702, and actuator system 704. Leading edge roller 708 and drag roller 710 can be seen in roller system 700. Leading edge roller 708 and drag roller 710 are examples of other rollers in an array of rollers for roller system 700 that are not seen in this view.

Leading edge roller 708 provides for structural strength and reinforcement of flexible skin 502 at leading edge 426. Drag roller 710 also may provide support for lower side 712 of flexible skin 502.

Linkage system 702 has five linkages, which form linkage assembly 713 in these examples. As depicted in linkage assembly 713, linkage system 702 has linkages 714, 716, 718, 720, and 722. These linkages take the form of elongate members or bars in these examples. Of course, a linkage may take any form that is capable of connecting different components to each other moveably and/or rigidly.

In this example, these different linkages are moveably attached to various components to change the shape of control surface 424. Linkage 714 is moveably connected to forward spar 724 and leading edge roller 708. Further, linkage 714 also provides a connection to upper support plate 706.

Actuation hinge rod 726 connects to actuator rod 728, which is in turn connected to actuator 730. Actuator 730 is mounted to forward spar 724 by actuator attachment bracket 732. Link 716 is attached to linkage 714, linkage 720, and linkage 718. Linkage 718 is connected to linkage 722, linkage 716, and linkage 720. Linkage 722 is connected to linkage 714, linkage 718, leading edge roller 708, and drag roller 710. Linkage 720 is connected to linkage 716, linkage 718, and forward spar 724.

As can be seen in this view, contiguous surface 734 for airfoil 404 is formed by flexible skin 502, rigid skin 736, and rigid skin 738. Flexible skin 502 is adjacent to rigid skin 736 and rigid skin 738. When flexible skin 502 changes shape, no overlap and/or gap between flexible skin 502, rigid skin 736, and rigid skin 738 occurs.

A gap is considered to be absent in the different advantageous embodiments when flow separation in localized regions on contiguous surface 734 does not occur. In other words, a seam and/or indentation may be present. This seam and/or indentation is not considered a gap when no separation of airflow occurs in a manner that causes an undesired reduction in performance of the aircraft. In other words, contiguous surface 734 is present while flexible skin 502 changes shape between a plurality of different shapes.

Actuator 704 may take various forms. For example, actuator 704 may be an electric motor, a pneumatic cylinder, a hydraulic cylinder, a shape memory alloy apparatus, or some other suitable actuation mechanism. In these examples, actuator 704 may move actuator rod 726 in the direction of arrow 740 to change the shape of control surface 424.

Figure 8:
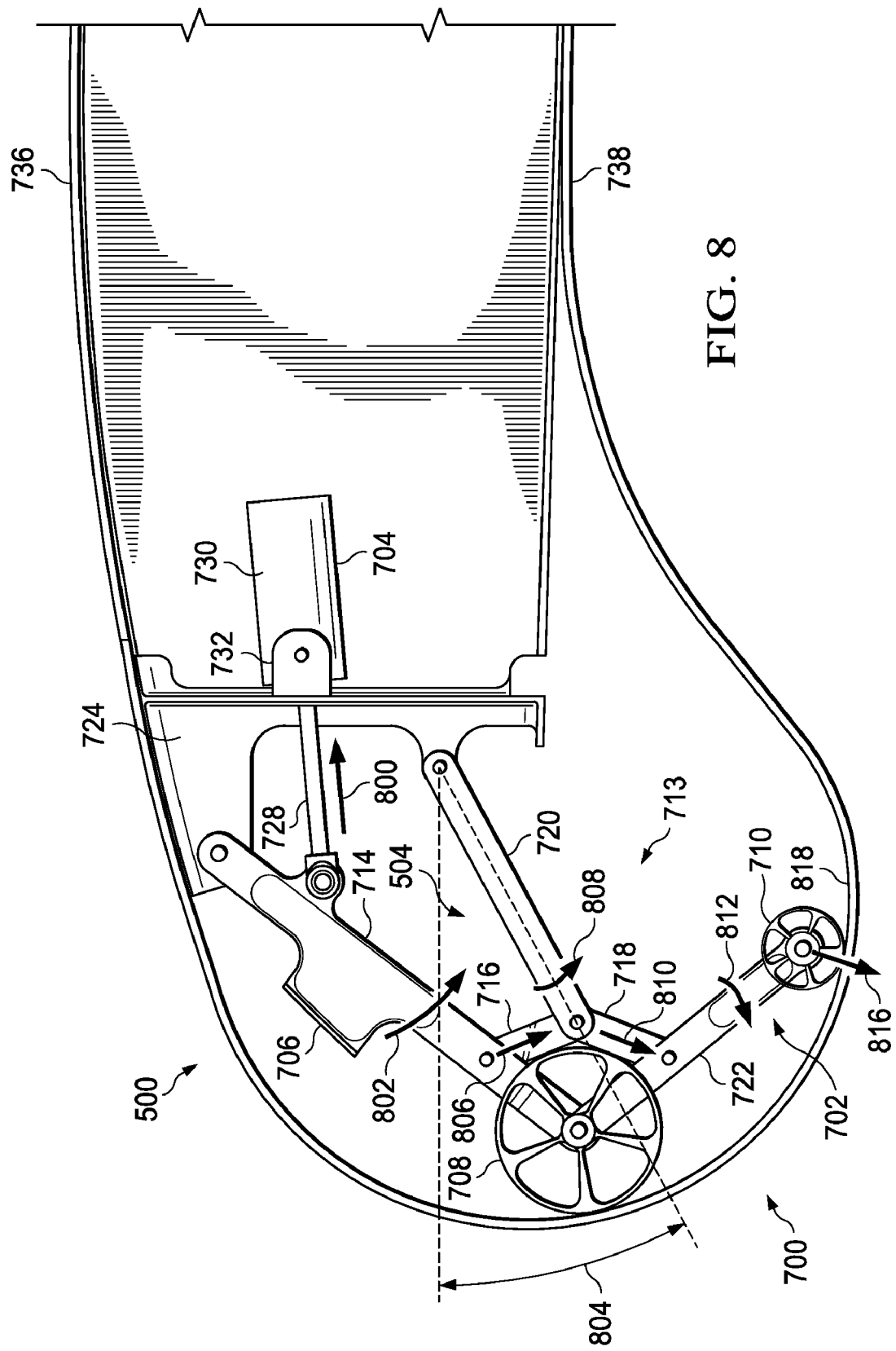
FIG. 8 is a diagram illustrating a changed shape for a control surface in accordance with an advantageous embodiment.

With reference now to FIG. 8, a diagram illustrating a changed shape for a control surface is depicted in accordance with an advantageous embodiment. In this example, shape control system 504 is shown in a deployed state.

Actuator 730 may move actuator rod 728 in the direction of arrow 800. This movement of actuator rod 728 may turn link 714 with rotational movement as indicated by arrow 802. This downward rotational movement of link 714 in the direction of arrow 802 generates droop angle 804 in this example. As actuator rod 728 moves farther in the direction of arrow 800, droop angle 804 increases in value.

As linkage 714 rotates downward in the direction of arrow 802, this movement is transferred through linkage 716 into linkage 720 as illustrated in the direction of arrow 806. Linkage 720 rotates downward as illustrated by arrow 808 in response to movement of linkage 716 in the direction of arrow 806. Linkage 720 is connected to linkage 716 and linkage 718, which causes linkage 718 to move downward in the direction of arrow 810.

This movement of linkage 718 in the direction of arrow 810 causes linkage 722 to move rotationally in the direction of arrow 812. This movement of linkage 722 spreads linkage 722 away from linkage 714. Further, drag roller 710 moves downward in the direction of arrow 816 and moves and/or rolls on inner surface 818. This movement of drag roller 710 causes flexible skin 502 to be pushed outward and down to generate a blunted shape for leading edge 426 of control surface 424.

In this example, flexible skin 502 may be fixably attached to airfoil 404 in a manner that forms contiguous surface 734 without gaps that may cause undesired airflow, reducing aerodynamic performance.

Figure 9:
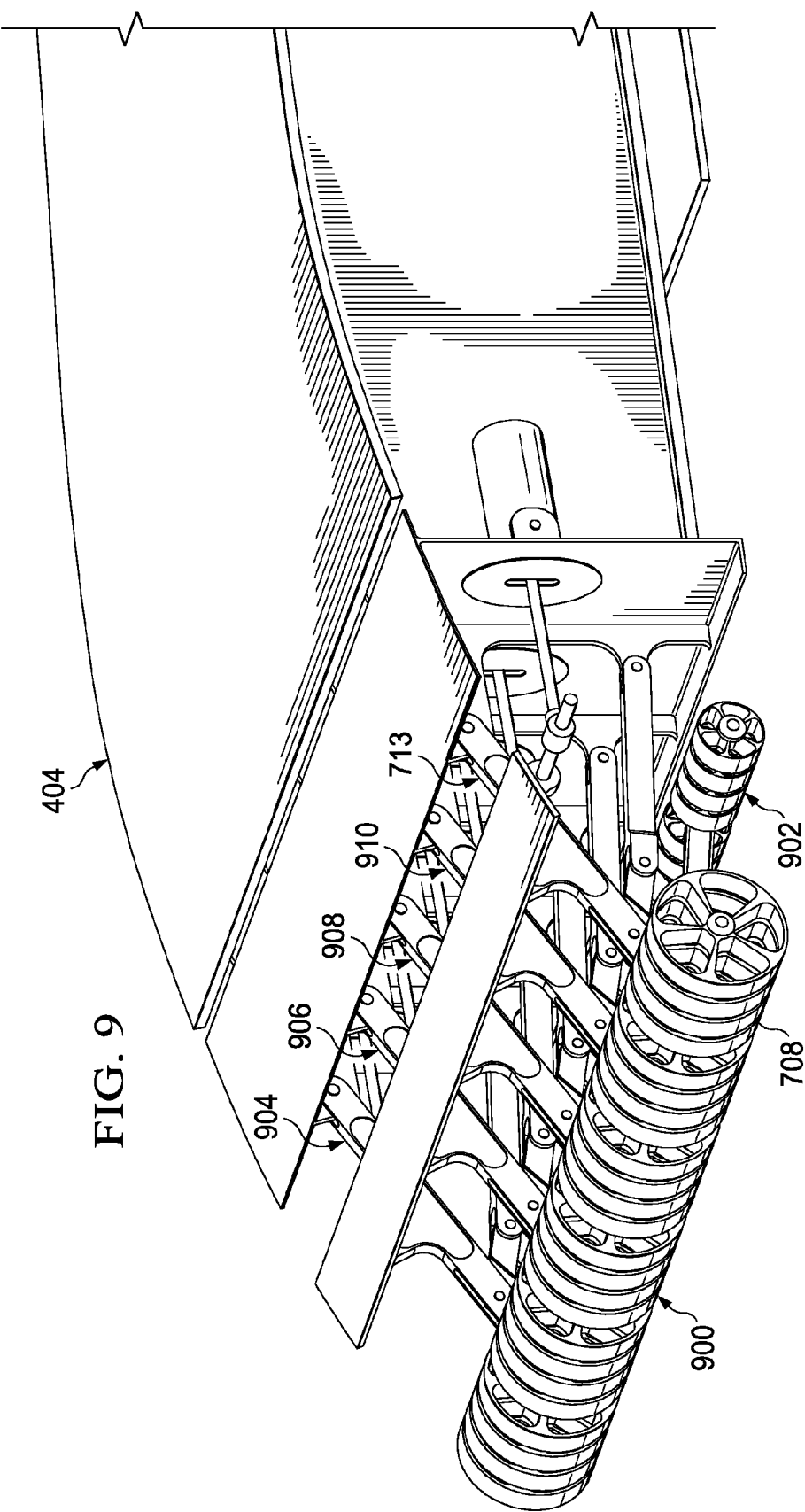
FIG. 9 is a diagram illustrating a portion of an airfoil in accordance with an advantageous embodiment.

With reference now to FIG. 9, a diagram illustrating a portion of an airfoil is depicted in accordance with an advantageous embodiment. In this example, a perspective view of a portion of airfoil 404 is depicted in accordance with an advantageous embodiment. In this example, the flexible skin has been removed to illustrate other components in shape control system 504.

In this view, leading edge rollers 900 are seen along with leading edge roller 708. Drag rollers 902 are also visible along with drag roller 710. As can be seen, linkage system 702 includes additional linkage assemblies, such as linkage assemblies 904, 906, 908, and 910 in addition to linkage assembly 713. In this perspective view, shape control system 504 is illustrated in an undeployed state.

In FIG. 10, a diagram illustrating a portion of an airfoil is depicted in accordance with an advantageous embodiment. In this example, a perspective view of airfoil 402 is illustrated with shape control system 504 in a deployed state.

Figure 11:
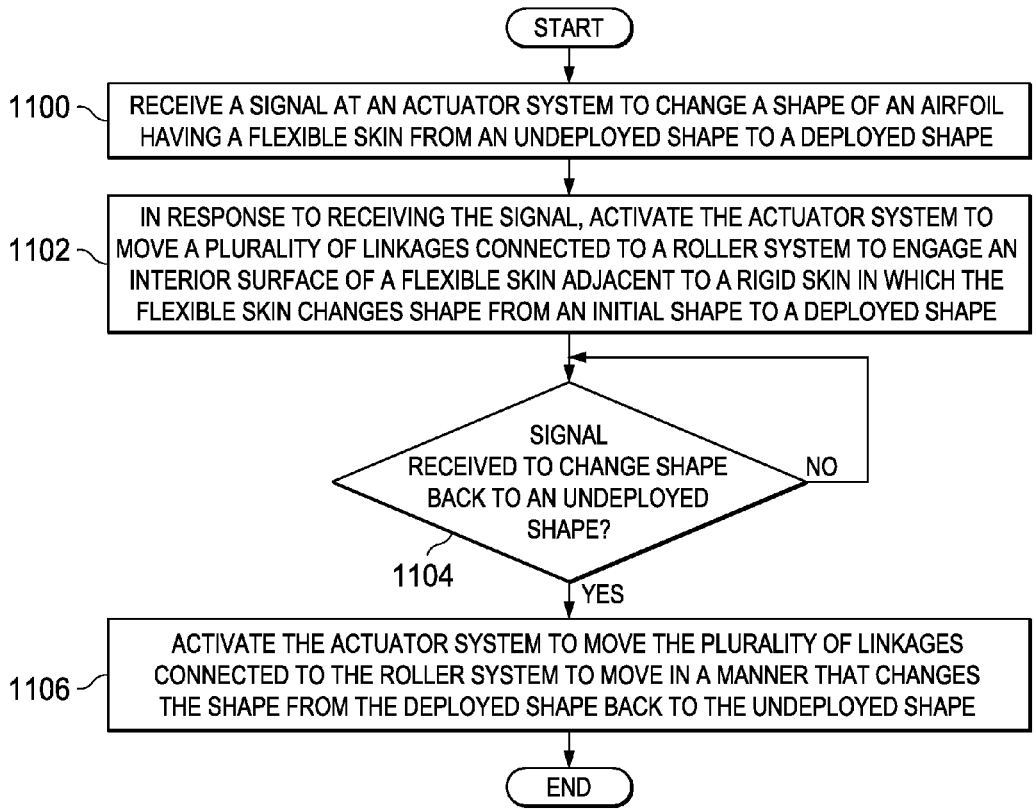
FIG. 11 is a flowchart of a process for changing a configuration of an airfoil in accordance with an advantageous embodiment.

With reference now to FIG. 11, a flowchart of a process for changing a configuration of an airfoil is depicted in accordance with an advantageous embodiment. The process illustrated in FIG. 11 may be implemented in an airfoil shape changing system such as, for example, airfoil shape changing system 300 in FIG. 3.

The process begins by receiving a signal at an actuator system to change a shape of an airfoil having a flexible skin from an undeployed shape to a deployed shape (operation 1100). In response to receiving the signal, the actuator system is activated to move a plurality of linkages connected to a roller system to engage an interior surface of a flexible skin adjacent to a rigid skin in which the flexible skin changes shape from an initial shape to a deployed shape (operation 1102).

A determination is made as to whether a signal has been received to change the shape back to an undeployed shape (operation 1104). If a signal has not been received, the process returns to operation 1104. Otherwise, the process activates the actuator system to move the plurality of linkages connected to the roller system to move in a manner that changes the shape from the deployed shape back to the undeployed shape (operation 1106), with the process terminating thereafter.

Thus, the different advantageous embodiments provide a method and apparatus for changing the shape of an airfoil for an aircraft. The different advantageous embodiments provide a capability to change the shape of an airfoil such as at control surfaces to change the aerodynamic characteristics of the airfoil. The different advantageous embodiments provide a capability to change the airfoil shape without gaps and/or portions of the surface sliding under other portions of the surface. The different advantageous embodiments provide this capability through a flexible skin and a shape control system for the control surface.

The descriptions of the different advantageous embodiments have been presented for purposes of illustration and description, and they are not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   an airfoil;
   a flexible skin forming a control surface of the airfoil; and
   a shape control system capable of changing a shape of the control surface formed by the flexible skin between a plurality of shapes, wherein the shape control system comprises a plurality of rollers capable of engaging an interior surface of the of the flexible skin, wherein the plurality of rollers comprises a first plurality of leading edge rollers arranged in a first array and a second plurality of drag rollers arranged in a second array that is substantially parallel to the first array.

2. The apparatus of claim 1, wherein the shape control system further comprises:
   a linkage system connected to the plurality of rollers and capable of moving the plurality of rollers.

3. The apparatus of claim 2, wherein the shape control system further comprises:
   an actuator system capable of moving the linkage system.

4. The apparatus of claim 3, wherein the shape control system further comprises:
   an upper support plate capable of providing support to an upper part of the flexible skin in an undeployed shape in the plurality of shapes.

5. The apparatus of claim 1 further comprising:
   a rigid skin forming another portion of the airfoil.

6. The apparatus of claim 5, wherein the flexible skin is adjacent to the rigid skin and forms a contiguous skin surface.

7. The apparatus of claim 1, wherein the flexible skin is located at an edge of the airfoil and wherein changing from an undeployed shape to a deployed shape causes the edge of the airfoil to increase a bluntness of the edge and a droop angle of the edge.

8. The apparatus of claim 1, wherein the control surface is selected from one of a leading edge of the airfoil, a trailing edge of the airfoil, a spoiler, a flap, an elevator, a rudder, a slat, and an airbrake.

9. The apparatus of claim 1, wherein the airfoil is an aircraft wing.

10. The apparatus of claim 1 further comprising:
    an object, wherein the airfoil is connected to the object, wherein the object is selected from one of a mobile platform, an aircraft, a surface ship, a tank, a personnel carrier, a train, a spacecraft, a submarine, a bus, and an automobile.

11. The apparatus of claim 1, wherein the flexible skin is an elastic skin.

12. An aircraft comprising:
    an airfoil;
    a flexible skin forming a portion of a surface of the airfoil;
    a first rigid skin forming another portion of the surface of the airfoil;
    a second rigid skin forming yet another portion of the surface of the airfoil, wherein the flexible skin extends between the first rigid skin and the second rigid skin and is adjacent to the first rigid skin and the second rigid skin to form a contiguous skin surface for the airfoil;
    a roller system capable of engaging an interior surface of the flexible skin, wherein the roller system comprises leading edge rollers and drag rollers having a different diameter from the leading edge rollers;
    a plurality of linkages coupled to the roller system; and
    an actuator system capable of moving the plurality of linkages in a manner that causes the roller system to move against an interior of the flexible skin to change a shape of a portion of the flexible skin between the first rigid skin and the second rigid skin,
    wherein the flexible skin remains adjacent to the first rigid skin and the second rigid skin when the actuator system is moving the plurality of linkages to change the shape of the flexible skin.

13. The aircraft of claim 12, wherein the flexible skin is located at a leading edge of the airfoil, and wherein the leading edge rollers are capable of being moved by the plurality of linkages into a position that increases a bluntness of the leading edge, and wherein the drag rollers are capable of being moved to a deployed shape to increase a droop angle of the leading edge.

14. The aircraft of claim 12 further comprising:
    an upper support plate capable of providing support to an upper part of the flexible skin in an undeployed shape in the plurality of shapes.

15. The aircraft of claim 12, wherein the flexible skin is an elastic skin.

* * * * *